(12) United States Patent
Shimatani

(10) Patent No.: US 11,134,211 B2
(45) Date of Patent: Sep. 28, 2021

(54) IMAGE PROCESSING APPARATUS

(71) Applicant: KYOCERA Document Solutions Inc., Osaka (JP)

(72) Inventor: Akira Shimatani, Osaka (JP)

(73) Assignee: Kyocera Document Solutions, Inc.

(*) Notice: Subject to any disclaimer, the term of this patent is extended or adjusted under 35 U.S.C. 154(b) by 0 days.

(21) Appl. No.: 17/030,748

(22) Filed: Sep. 24, 2020

(65) Prior Publication Data

US 2021/0099661 A1 Apr. 1, 2021

(30) Foreign Application Priority Data

Sep. 26, 2019 (JP) .............................. JP2019-176260

(51) Int. Cl.
*H04N 5/376* (2011.01)
*H04N 5/357* (2011.01)
*H04N 5/378* (2011.01)

(52) U.S. Cl.
CPC ......... *H04N 5/3765* (2013.01); *H04N 5/3572* (2013.01); *H04N 5/378* (2013.01)

(58) Field of Classification Search
CPC .... H04N 5/3765; H04N 5/3572; H04N 5/378; H04N 5/3577; H04N 1/4076; H04N 1/401; H04N 5/3692
See application file for complete search history.

(56) References Cited

U.S. PATENT DOCUMENTS

| 8,212,908 | B2 * | 7/2012 | Nagase | H04N 5/3765 348/312 |
| 2005/0083544 | A1 * | 4/2005 | Kondoh | H04N 1/401 358/1.9 |
| 2008/0204820 | A1 * | 8/2008 | Ito | H04N 1/4076 358/461 |
| 2008/0297616 | A1 * | 12/2008 | Nagase | H04N 5/3692 348/222.1 |

FOREIGN PATENT DOCUMENTS

| JP | 2006165835 | A | * | 6/2006 | ........... H04N 5/3572 |
| JP | 2007143040 | A | * | 6/2007 | ........... H04N 5/3765 |
| JP | 2018-088568 | | | 6/2018 | |
| JP | 2018088568 | A | * | 6/2018 | ........... H04N 5/3572 |

* cited by examiner

*Primary Examiner* — Nhan T Tran

(57) ABSTRACT

In image processing apparatus, a sample hold unit samples and holds an output signal of the image sensor. A timing signal generating circuit generates a sampling clock to specify a sampling timing of the sample hold unit. A controller sets a phase of the sampling clock to the timing signal generating circuit. In an adjustment process that adjusts the phase of the sampling clock, the controller (a) causes the image sensor to scan a reference board, (b) sets predetermined plural phases to the timing signal generating circuit in turn, (c) calculates average values of image data obtained correspondingly to the plural phases and calculates a value of a parameter that indicates a fluctuation width of the average values, and (d) sets the phase of the sampling clock as a phase corresponding to the smallest value of the parameter.

6 Claims, 5 Drawing Sheets

IMAGE PROCESSING APPARATUS

CROSS-REFERENCE TO RELATED APPLICATIONS

This application relates to and claims priority rights from Japanese Patent Application No. 2019-176260, filed on Sep. 26, 2019, the entire disclosures of which are hereby incorporated by reference herein.

BACKGROUND

1. Field of the Present Disclosure

The present disclosure relates to an image processing apparatus.

2. Description of the Related Art

When scanning an image using an image sensor, at a sample hold timing, an output signal of the image sensor is sampled and held, and thereby an analog image signal is generated.

An image processing apparatus uses a spread spectrum clock generator (SSCG) to restrain unnecessary radiation, and due to the spread spectrum, noise occurs in line image data and deteriorates image quality, and therefore, the image processing apparatus detects the noise component, and performs correction of the image data so as to restrain the noise component on the basis of a value of the noise component.

However, in the aforementioned image processing apparatus, some circuits are required for deriving the noise component and the correction of the image data, and consequently, may result in a high cost.

SUMMARY

An image processing apparatus according to an aspect of the present disclosure includes an image sensor, a sample hold unit, a timing signal generating circuit, and a controller. The sample hold unit is configured to sample and hold an output signal of the image sensor. The timing signal generating circuit is configured to generate a sampling clock to specify a sampling timing of the sample hold unit. The controller is configured to set a phase of the sampling clock to the timing signal generating circuit. Further, the controller performs an adjustment process that adjusts the phase of the sampling clock, and in the adjustment process, (a) causes the image sensor to scan a reference board, (b) sets predetermined plural phases to the timing signal generating circuit in turn, (c) calculates average values of image data obtained correspondingly to the plural phases and calculates a value of a parameter that indicates a fluctuation width of the average values, and (d) sets the phase of the sampling clock as a phase that makes the value of the parameter smallest.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
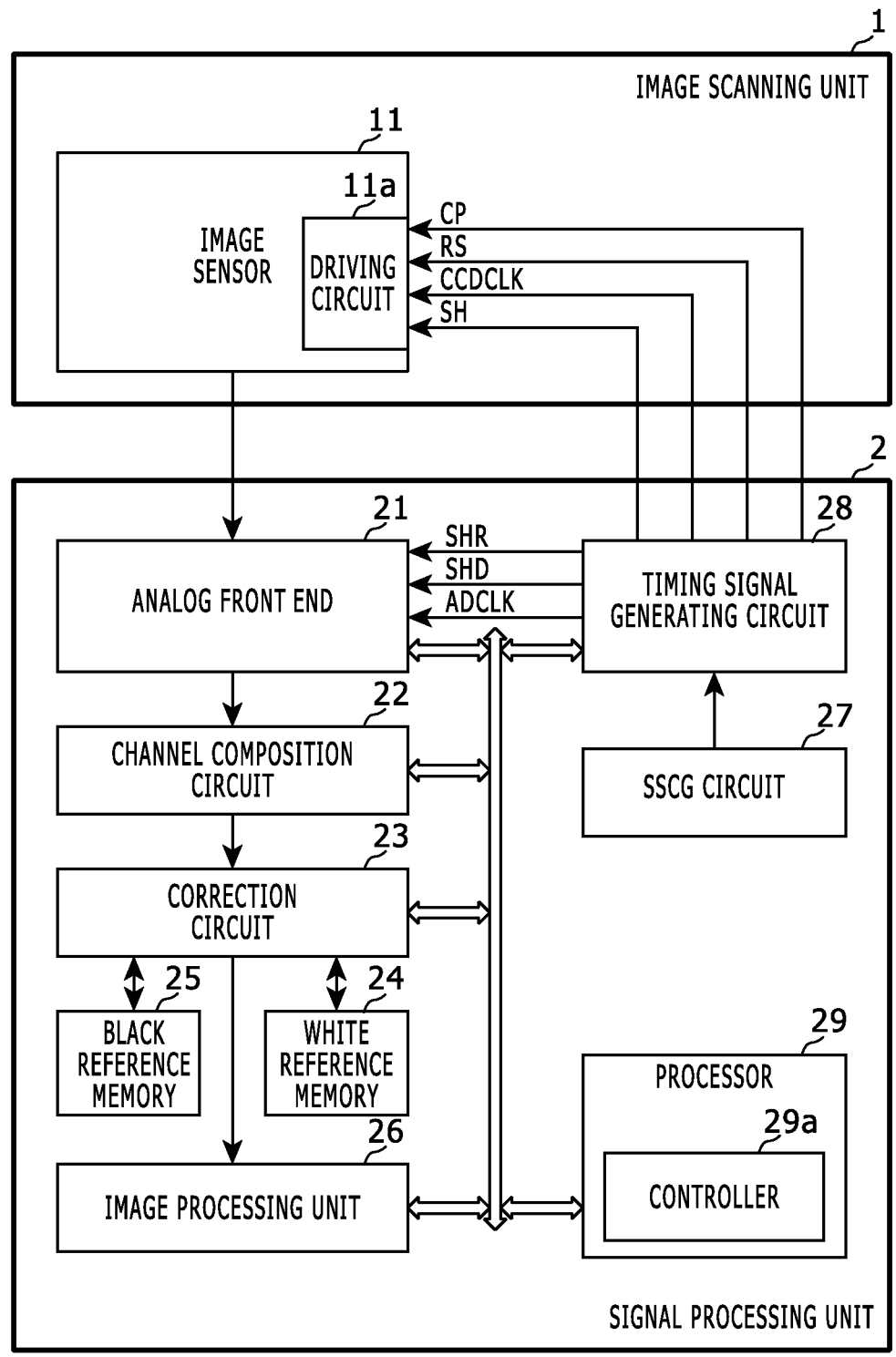
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. In this embodiment, the image processing apparatus shown in FIG. 1 is an image scanning apparatus such as a scanner or a multi function peripheral, and includes an image scanning unit 1 and a signal processing unit 2.

The image scanning unit 1 includes an image sensor 11. The image sensor 11 is driven in accordance with driving signals such as a clamp signal CP, a reset signal RS, a clock CCDCLK, and a shift pulse SH by a driving circuit 11a, and receives light of a document image and thereby output an electric signal corresponding to the document image.

Figure 2:
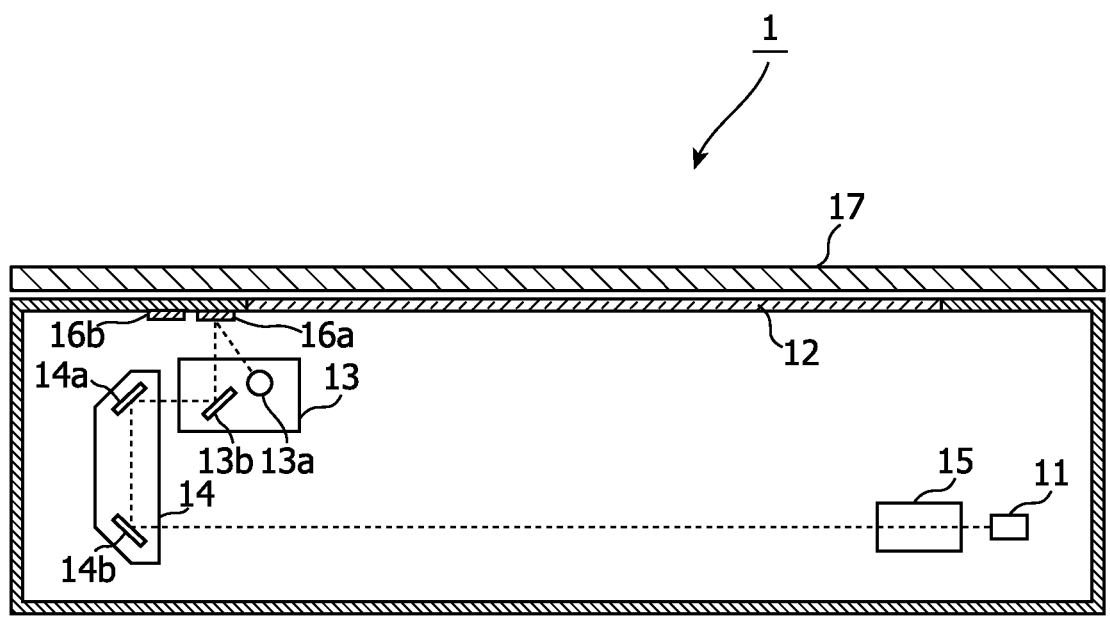
FIG. 2 shows a side view that indicates a configuration of the image scanning unit 1 shown in FIG. 1.

FIG. 2 shows a side view that indicates a configuration of the image scanning unit 1 shown in FIG. 1. As shown in FIG. 2, the image scanning unit 1 includes not only the image sensor 11 but a contact glass 12, carriages 13 and 14, an imaging lens 15, reference boards 16a and 16b, and a platen cover 17. The contact glass 12 is arranged on a top surface of a main body of the image scanning unit 1, and a document is put on the contact glass 12. The carriage 13 is arranged so as to be capable of moving in a secondary scanning direction using an unshown driving source. The carriage 13 includes a light source 13a (i.e. lighting) and a mirror 13b. The light source 13a is, for example, plural light emitting diodes arranged along a primary scanning direction. Light emitted from the light source 11 falls on the reference board 16a or 16b, a document put on the contact grass 12, or the like correspondingly to a position of the carriage 13. The mirror 13b is an optical element that reflects a reflection light from the reference board 16a or 16b, the document or the like so as to output it along a predetermined direction toward the carriage 14. The carriage 14 reflects the light from the mirror 13b using mirrors 14a and 14b, and outputs toward the imaging lens 15. The imaging lens 15 focuses the light from the carriage 14 onto an image sensor 11.

The image sensor 11 receives the reflection light corresponding to the light emitted from the light source 13a through a predetermined optical system (here, the mirrors 13b, 14a, and 14b, and the imaging lens 15). The image sensor 11 outputs an electric signal corresponding to received light amounts on plural pixels for each line. In this embodiment, as the image sensor 11, a CCD (Charge Coupled Device) is used.

The reference boards 16a and 16b are board-shaped members that are arranged along the primary scanning direction on a ceiling surface in an inside of the apparatus, and are used to obtain reference data of white and black.

Returning to FIG. 1, the signal processing unit 2 includes an analog front end (AFE) 21, a channel composition circuit 22, a correction circuit 23, a white reference memory 24, a black reference memory 25, an image processing unit 26, an SSCG circuit 27, a timing signal generating circuit 28, and a processor 29.

The analog front end (AFE) 21 is a circuit that performs sample-hold, AGC (automatic gain control), and A/D (Analog to Digital) conversion.

The AFE 21 samples and holds an output signal of the image sensor 11 at a timing specified with a sampling clock.

In this embodiment, the AFE 21 acts as a sample hold unit that samples and holds an output signal of the image sensor 11, and perform the sample-hold in a CDS (Correlated Double Sampling) manner. Specifically, the AFE 21 samples two values in accordance with a reset sampling clock SHR and a data sampling clock SHD, and outputs a difference between the two values.

The channel composition circuit 22 changes an order of output data of the AFE 21 and thereby outputs image data as RGB data in an order along a scanning direction.

The correction circuit 23 performs shading correction for the aforementioned image data on the basis of a white reference value stored in the white reference memory 24 and a black reference value stored in the black reference memory 25. The white reference value is an RGB data value obtained when the white reference board 16a is scanned, the black reference value is an RGB data value obtained when the light source 13a is turned off and the black reference board 16b is scanned, and these reference values are measured in advance.

The image processing unit 26 performs a predetermined image process for the image data after the shading correction, if required.

The SSCG circuit 27 oscillates and thereby generates a reference clock having a fixed period, and generates a clock (SS clock) that obtained by modulating the reference clock in a spread spectrum manner. For example, the SSCG circuit 27 modulates the reference clock of 40 MHz with a modulation period of 2000 clocks and a center spread of +/−1 percent, and thereby generates the SS clock.

The timing signal generating circuit 28 generates on the basis of the SS clock (a) a driving signal to be supplied to the driving circuit 11a and (b) clock signals (here, the sampling clocks SHR and SHD, a clock ADCLK to specify a timing of the A/D conversion, and the like) to be supplied to the AFE 21.

For example, the timing signal generating circuit 28 divides the SS clock by a predetermined multiple (e.g. 20) and thereby generates the aforementioned driving signal and the aforementioned clock signals. In this case, if the reference clock has a frequency of 40 MHz, then frequencies of the sampling clocks SHR and SHD are 20 MHz. Further, the timing signal generating circuit 28 performs multiplication of the SS clock by a predetermined multiple (e.g. 10) and thereby generates phase adjustment clock, and sets pulse positions (i.e. phases) of the sampling clocks SHR and SHD such that the pulse positions synchronize with any pulse timings (phases) of the phase adjustment clock.

The processor 29 includes a CPU (Central Processing Unit), a ROM (Read Only Memory), a RAM (Random Access Memory) and the like, loads a program from the ROM or an unshown storage device to the RAM, and executes the program with the CPU and thereby acts as various processing units. Here, the processor 29 acts as a controller 29a.

The controller 29a sets the aforementioned phases of the sampling clocks SHR and SHD to the timing signal generating circuit 28.

Figure 3:
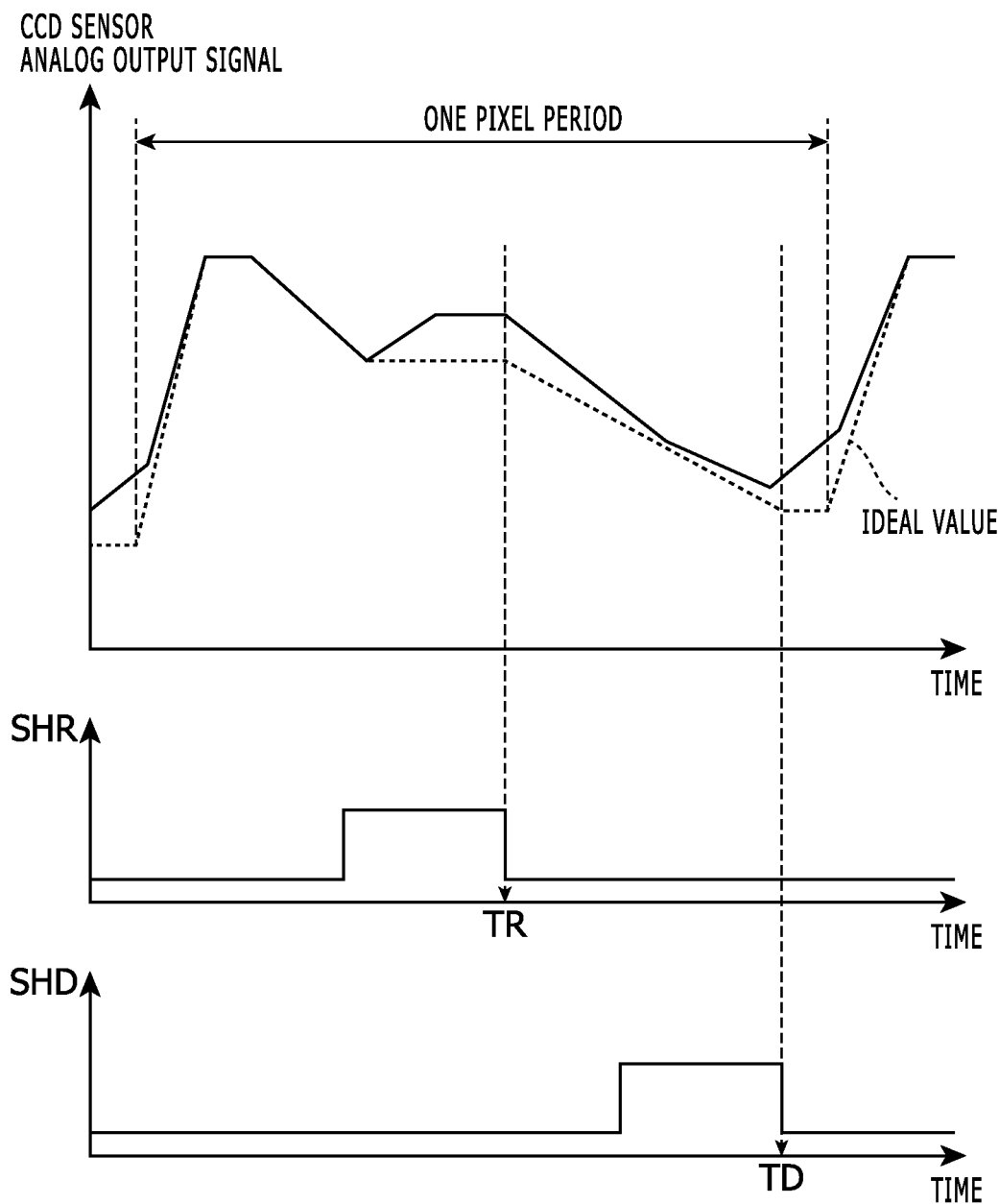
FIG. 3 shows a timing chart that explains a sampling clock in the image processing apparatus shown in FIG. 1.

FIG. 3 shows a timing chart that explains a sampling clock in the image processing apparatus shown in FIG. 1. As shown in FIG. 3, the timing signal generating circuit 28 generates the aforementioned sampling clocks SHR and SHD such that clock pulses thereof are positioned at timings TR and TD corresponding to the set phases. Thus, the sampling timings are adjusted by the controller 29a.

Figure 4:
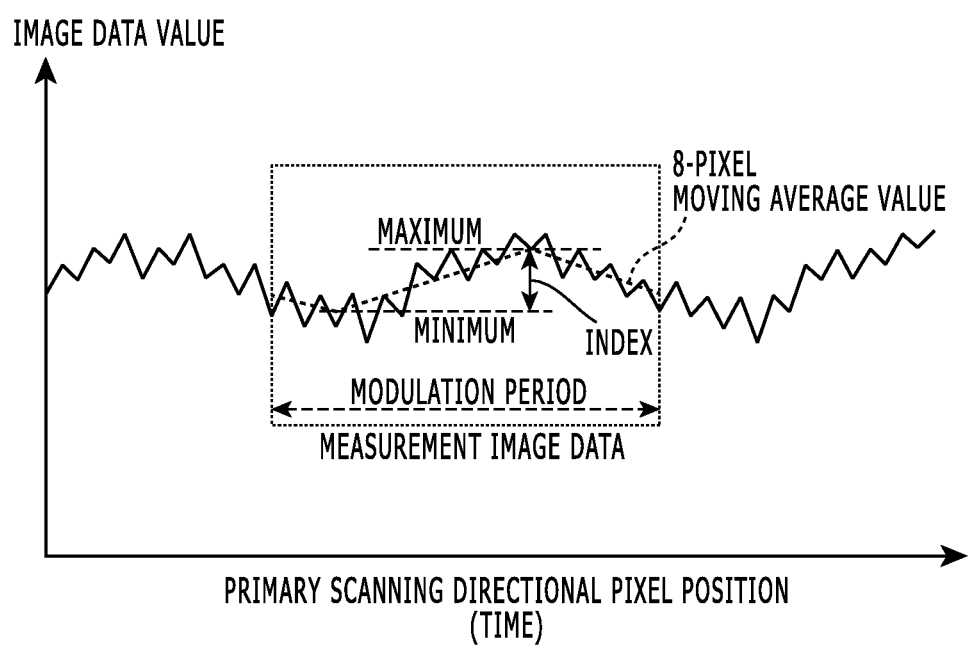
FIG. 4 shows a timing chart that explains a parameter measured in the image processing apparatus shown in FIG. 1.

FIG. 4 shows a timing chart that explains a parameter measured in the image processing apparatus shown in FIG. 1.

Specifically, the controller 29a performs an adjustment process to adjust phases of the sampling clocks SHR and SHD; and in the adjustment process, (a) causes the image sensor 11 to continuously scan a reference board (the reference board 16a or 16b), (b) sets predetermined plural phases to the timing signal generating circuit 28 in turn, (c) as shown in FIG. 4, calculates average values of image data (e.g. each color data in RGB data) obtained correspondingly to the plural phases, and calculates a value of a parameter that indicates a fluctuation width of the average values, and (d) sets the phases of the sampling clocks SHR and SHD as phases that make the value of the parameter smallest.

In this embodiment, this average value is an average value through, for example, 8 pixels, and this parameter is a difference between a largest value and a smallest value of the average values within a predetermined section. Further, this predetermined section is set as, for example, a section that has the same time length as a modulation period of the SS clock of the SSCG circuit 27 or a section that has a longer time length than the modulation period (e.g. if the modulation period is 2000 pixels, a section of 2000 pixels or longer).

As mentioned, by virtue of the average value, a fluctuation of pixel values of relatively low frequency due to the spread spectrum is detected, but another noise component of relatively high frequency is removed.

In this embodiment, the image sensor 11 is a CCD sensor and consequently even when the lighting is turned off, a fluctuation of image data values occurs due to the spread spectrum, and therefore in the adjustment process, the controller 29a turns off the light source 13a, moves the carriage 13 to a position corresponding to the black reference board 16b, and causes the image sensor 11 to scan the black reference board 16b.

Further, in this embodiment, the controller 29a (a) sets a predetermined reference phase to the timing signal generating circuit 28 at a predetermined timing (e.g. at starting of this image processing apparatus, at resuming of a normal mode from sleeping, or the like), calculates an average value of image data obtained correspondingly to the reference phase, and determines whether a value of the aforementioned parameter exceeds a predetermined threshold value or not, and (b1) if the value of the parameter exceeds the threshold value, immediately performs the adjustment process and (b2) if the value of the parameter does not exceed the threshold value, does not perform the adjustment process at this timing.

The aforementioned reference phase is determined in advance, for example, on the basis of stability of the image data values, an amplitude of an SSCG modulation frequency component, a light amount fluctuation of the light source 13a, and/or the like, and set in advance by the controller 29a.

Further, the aforementioned predetermined threshold value is set on the basis of a limit value that a fluctuation of the image data values due to the spread spectrum gets visible on the scanned image. For example, in 8-bit image data, if the limit value is +/−0.25, and a fluctuation of the measured data value is +/−1, then the predetermined threshold value is set as 2.5 (=(1+0.25)*2).

Furthermore, when setting the aforementioned phase in the adjustment process or the like, the controller 29a adjusts an offset and a gain of the AFE 21 for each phase.

Figure 5:
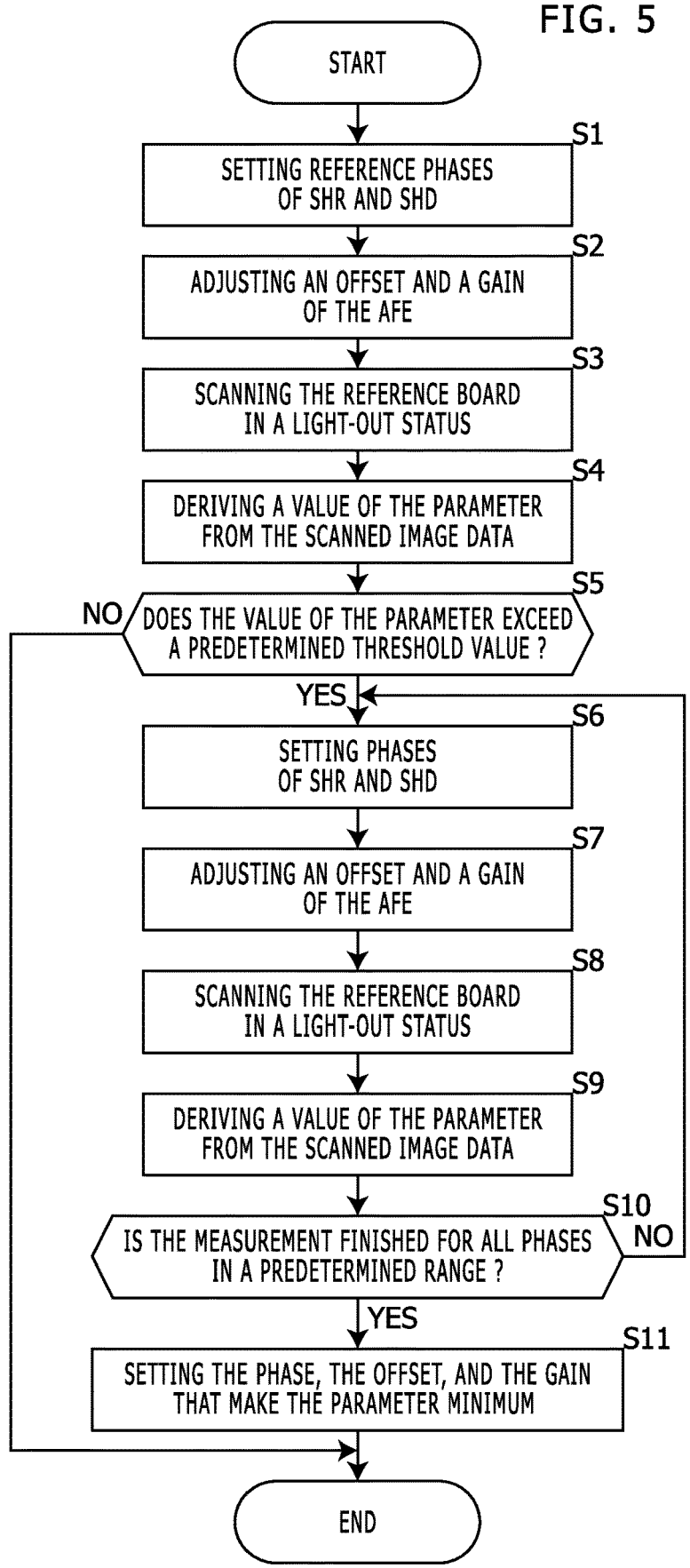
FIG. 5 shows a flowchart that explains a behavior of the image processing apparatus shown in FIG. 1.

The following part explains a behavior of the aforementioned image processing apparatus. FIG. 5 shows a flowchart that explains a behavior of the image processing apparatus shown in FIG. 1.

At the aforementioned predetermined timing, the controller 29a performs the following process.

Firstly, the controller 29a sets a predetermined reference phase to the timing signal generating circuit 28 (in Step S1), adjusts an offset and a gain of the AFE 21 correspondingly to the reference phase (in Step S2), and controls the image scanning unit 1 and thereby turns off the light source 13a and causes the image sensor 11 to scan the reference board 16b (in Step S3).

Consequently, an output signal corresponding to the reference board 16b is supplied from the image sensor 11 to the AFE 21, and using the AFE 21, the output signal is sampled and held in accordance with the sampling clock that the reference phase is set, and the image data after the A/D conversion is generated.

The controller 29a obtains the image data from the AFE 21, calculates average values of the image data, and derives a value of the aforementioned parameter (in Step S4), and determines whether the value of the parameter exceeds the predetermined threshold value or not (in Step S5).

If the value of the aforementioned parameter exceeds the predetermined threshold value, then the controller 29a immediately performs the adjustment process (Steps S6 to S11), and otherwise if not, then does not performs the adjustment process at this timing.

In the adjustment process, the controller 29a selects one of unselected phases among predetermined plural phases (i.e. phases in a pixel period of an output signal of the image sensor 11, e.g. 36 phases with 10-degree intervals), and sets the selected phase to the timing signal generating circuit 28 (in Step S6), adjusts an offset and a gain of the AFE 21 correspondingly to the selected phase (in Step S7), and controls the image scanning unit 1 and thereby turns off the light source 13a and causes the image sensor 11 to scan the reference board 16b (in Step S8).

Consequently, an output signal corresponding to the reference board 16b is supplied from the image sensor 11 to the AFE 21, and using the AFE 21, the output signal is sampled and held with the sampling clock of the currently set phase, and the image data after the A/D conversion is generated.

The controller 29a obtains the image data from the AFE 21, calculates average values of the image data, and derives a value of the aforementioned parameter (in Step S9).

Subsequently, the controller 29a determines whether the measurement of the parameter value has been finished for all of the aforementioned plural phases or not (in Step S10), and if the measurement has not been finished yet (i.e. if there is at least one unselected phase), then returning to Step S6, selects a next unselected phase and performs subsequent processes as well for this next phase.

Contrarily, if the measurement has been finished, the controller 29a determines a phase corresponding to the smallest value of the parameter among the parameter values corresponding to the aforementioned plural phases (i.e. a phase that makes a fluctuation of the average values smallest), sets phases of the sampling clocks SHR and SHD as the determined phase to the timing signal generating circuit 28, and further adjusts an offset and a gain of the AFE 21 correspondingly to the phase(s) (in Step S11). It should be noted that a pulse interval between the sampling clocks SHR and SHD is fixed, and on the basis of one phase, both pulse positions of the sampling clocks SHR and SHD are specified. For example, a pulse position of the sampling clock SHR is specified with the aforementioned phase (i.e. the phase set by the controller 29a), and a pulse of the sampling clock SHD is arranged at a position obtained by shifting the pulse position of SHR by a predetermined time (i.e. the fixed pulse interval). Here, a pulse interval between the sampling clocks SHR and SHD is fixed. Alternatively, the pulse interval may be adjusted within a range specified in preset phase setting.

Thus, the controller 29a repeatedly shifts a phase (a timing) of a pulse of the sampling clock shown in FIG. 3 and selects a phase that makes a fluctuation of the average values smallest, and consequently, restrains a fluctuation of the image data values due to the spread spectrum.

When the sampling is performed in a section where a value of the output signal of the image sensor 11 does not change, for example, as shown in FIG. 3, even if a sampling timing is fluctuated due to the spread spectrum, the sampled value does not change. Contrarily, when the sampling is performed in a section where a value of the output signal of the image sensor 11 changes, if a sampling timing is fluctuated due to the spread spectrum, the sampled value changes. Therefore, the phase is repeatedly shifted and is selected such that the aforementioned fluctuation width gets small, and consequently, the sampling tends to be performed in a section where a value of the output signal of the image sensor does not change, and a fluctuation due to the spread spectrum is restrained of the image data values. In particular, an actual waveform (solid line in FIG. 3) of the output signal of the image sensor 11 is rounded due to an inductor component and a capacitor component of a transmission path, more than an ideal waveform (dashed line in FIG. 3), and consequently, the sampled value tends to fluctuate due to the spread spectrum.

As mentioned, if a large fluctuation of the average values of the image data occurs at the reference phase, the adjustment process is performed. Therefore, if due to aging change, such large fluctuation occurs at the reference phase, then the adjustment process is performed, and consequently, a fluctuation due to the spread spectrum is properly restrained of the image data values.

As mentioned, in the aforementioned embodiment, the analog front end (AFE) 21 samples and holds an output signal of the image sensor 11. The timing signal generating circuit 28 generates a sampling clock to specify a sampling timing of the AFE 21. The controller 29a performs an adjustment process that adjusts the phase of the sampling clock, and in the adjustment process, (a) causes the image sensor 11 to a reference board, (b) sets predetermined plural phases to the timing signal generating circuit 28 in turn, (c) calculates average values of image data obtained correspondingly to the plural phases and calculates a value of a parameter that indicates a fluctuation width of the average values, and (d) sets the phase of the aforementioned sampling clock as a phase that makes the value of the parameter smallest.

Thus, without correction of the image data value to remove a fluctuation of the image data value due to the spread spectrum, a fluctuation of the image data value due to the spread spectrum is restrained by the adjustment of the sampling timing. Consequently, without hardware to correct the image data value, low image quality due to the spread spectrum is restrained with relatively low cost.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned, the image sensor 11 may be a CIS (CMOS Image Sensor). In such a case, a fluctuation of the image data value due to the spread spectrum does not occur in a light-out condition, and therefore, in the adjustment process, the controller 29a turns on the light source 13a and causes the image sensor 11 to scan the reference board 16a in a lighting condition, and calculates the aforementioned average value from the image data after shading correction.

What is claimed is:

1. An image processing apparatus, comprising:
   an image sensor;
   a sample hold unit configured to sample and hold an output signal of the image sensor;
   a timing signal generating circuit configured to generate a sampling clock to specify a sampling timing of the sample hold unit; and
   a controller configured to set a phase of the sampling clock to the timing signal generating circuit;
   wherein the controller performs an adjustment process that adjusts the phase of the sampling clock, and in the adjustment process, (a) causes the image sensor to scan a reference board, (b) sets predetermined plural phases to the timing signal generating circuit in turn, (c) calculates average values of image data obtained correspondingly to the plural phases and calculates a value of a parameter that indicates a fluctuation width of the average values, and (d) sets the phase of the sampling clock as a phase that makes the value of the parameter smallest.

2. The image processing apparatus according to claim 1 wherein the controller (a) at a predetermined timing, sets a predetermined reference phase to the timing signal generating circuit, calculates an average value of image data obtained correspondingly to the reference phase, and determines whether a value of the parameter exceeds a predetermined threshold value or not, and (b1) if the value of the parameter exceeds the predetermined threshold value, immediately performs the adjustment process, but (b2) if the value of the parameter does not exceed the predetermined threshold value, does not perform the adjustment process at this timing.

3. The image processing apparatus according to claim 1 wherein
   the sample hold unit is an analog front end; and
   the controller adjusts an offset and a gain of the analog front end for each of the phases.

4. The image processing apparatus according to claim 1 wherein
   the image sensor is a CCD sensor; and
   in the adjustment process, the controller causes the image sensor to scan the reference board in a light-out condition.

5. The image processing apparatus according to claim 1 wherein
   the image sensor is a CIS sensor; and
   in the adjustment process, the controller causes the image sensor to scan the reference board in a lighting condition, and calculates the average value from the image data after shading correction.

6. The image processing apparatus according to claim 1 wherein the parameter is a difference between a largest value and a smallest value of the average values within a predetermined section.

* * * * *